(12) United States Patent
Gordon (10) Patent No.: US 7,043,701 B2
(45) Date of Patent: May 9, 2006

(54) OPACITY DESKTOP WITH DEPTH PERCEPTION

(75) Inventor: Gerald S. Gordon, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 654 days.

(21) Appl. No.: 10/040,808

(22) Filed: Jan. 7, 2002

(65) Prior Publication Data

US 2003/0128242 A1 Jul. 10, 2003

(51) Int. Cl.
*G06F 3/00* (2006.01)
*G06F 9/00* (2006.01)
*G06F 17/00* (2006.01)

(52) U.S. Cl. .................. 715/848; 715/850; 715/861; 715/797; 715/757; 715/768

(58) Field of Classification Search ................ 715/848, 715/849, 850, 852, 836, 857, 782, 757, 851, 715/768; 345/355, 650, 592
See application file for complete search history.

(56) References Cited

U.S. PATENT DOCUMENTS

| 5,880,733 | A | | 3/1999 | Horvitz et al. |
| 5,920,687 | A | * | 7/1999 | Winner et al. ............... 345/422 |
| 6,088,032 | A | | 7/2000 | Mackinlay |
| 6,104,377 | A | | 8/2000 | Ledoux |
| 6,271,842 | B1 | | 8/2001 | Bardon et al. |
| 6,466,831 | B1 | * | 10/2002 | Shibata et al. ................. 700/85 |
| 6,661,426 | B1 | * | 12/2003 | Jetha et al. .................. 345/629 |

OTHER PUBLICATIONS

Hunt, Craig. Networking Personal Computers with TCP/IP. Jul. 1995 1st edition. pp. 1-10.*

* cited by examiner

*Primary Examiner*—Kristine Kincaid
*Assistant Examiner*—Ryan Pitaro
(74) *Attorney, Agent, or Firm*—Fay, Sharpe, Fagan, Minnich & McKee, LLP (57) ABSTRACT

A method of displaying information within a three-dimensional workspace on a computer display includes partitioning the workspace into a plurality of layers, where each layer corresponds to a display depth relative to a user. At least one substantially opaque container object is displayed at a first display depth. The user is provided with a pointer operative to select objects within the three-dimensional workspace at a plurality of display depths. In response to the user selecting a container object, the opacity level of the selected container object is reduced in order to reveal at least one content object contained therein. The at least one content object contained within the selected container object is displayed at a deeper display depth relative to the first display depth. By combining three-dimensional depth cues with opacity level adjustment the present invention provides a visually pleasing computer workspace with enhanced depth perception and organization features.

17 Claims, 9 Drawing Sheets

OPACITY DESKTOP WITH DEPTH PERCEPTION

BACKGROUND OF THE INVENTION

The present invention relates to the art of computer display systems. It finds particular application in conjunction with a method and apparatus for providing a three-dimensional desktop display where objects are displayed with varying display depths and degrees of opacity, and will be described with particular reference thereto. It is to be appreciated, however, that the invention is also amenable to other like applications.

Computers have become powerful tools for use in numerous applications including word processing, Internet research and web browsing, and advanced graphical arts displays and processing. Technological advances in the speed, processing power, and memory of computers, coupled with lower costs, have made them ideally suited for use in graphical display systems. Computer generated displays enable users to visualize two- and three-dimensional objects.

In a computer system, the workspace or desktop for viewing and processing documents and applications is the display screen or monitor. The operating system of the computer generally manages or controls the documents and/or applications displayed on the monitor. Early computer systems displayed only one document or application on the display screen at a time, therefor limiting the effective computer workspace. In order to switch among multiple applications or documents, the user was forced to close the application or document being displayed and open a different application or document. With the introduction of multitasking in graphical interfaces, the display screen has been divided into multiple portions, often referred to as windows. However, just as a physical desktop table becomes cluttered when multiple documents are being viewed, a computer display workspace becomes cluttered when multiple documents, applications, or icons are displayed simultaneously. Accordingly, there is a need to obtain more workspace on a computer desktop display. In addition, users are interested in experiencing visually pleasing displays and document access, especially when utilizing a computer for graphical arts applications The present invention contemplates a new and improved method and apparatus for presenting and organizing information within a three-dimensional workspace on a computer display, which overcomes the above-referenced problems and others.

SUMMARY OF THE INVENTION

In accordance with one aspect of the present invention, a method of displaying information within a three-dimensional workspace on a computer display includes partitioning the workspace into a plurality of layers, where each layer corresponds to a display depth relative to a user. At least one substantially opaque container object is displayed at a first display depth. The user is provided with a pointer operative to select objects within the three-dimensional workspace at a plurality of display depths. Responsive to the user selecting a container object, an opacity level of the selected container object is reduced in order to reveal at least one content object contained therein. In addition, the at least one content object contained within the selected container object is displayed at a deeper display depth relative to the first display depth.

In accordance with a more limited aspect of the present invention, the step of reducing the opacity level of the selected container object includes determining a desired opacity level for the selected container object and selecting a dither pattern corresponding to the desired opacity level. Pixels corresponding to the container object are replaced with pixels corresponding to the at least one content object in accordance with the selected dither pattern.

In accordance with a more limited aspect of the present invention, the providing step includes receiving a control signal indicating a user preference for either a two-dimensional pointer, which is operative to select objects at the first display depth, or a three-dimensional pointer, which is operative to select objects at a plurality of display depths.

In accordance with a more limited aspect of the present invention, the method further includes dynamically adjusting the size of the three-dimensional pointer based upon the layer being accessed by the user, such that the three-dimensional pointer is larger at the first display depth than the plurality of other display depths.

One advantage of the present invention resides in a visually pleasing three-dimensional workspace on a computer display.

Another advantage of the present invention resides in a three-dimensional visual representation having display depth and variable opacity levels.

Another advantage of the present invention is resides in a three-dimensional computer workspace providing enhanced depth perception for graphical arts applications.

Yet another advantage of the present invention resides in a plurality of three-dimensional cabinet objects displayed on a desktop, which are secured through separate passwords.

Still other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
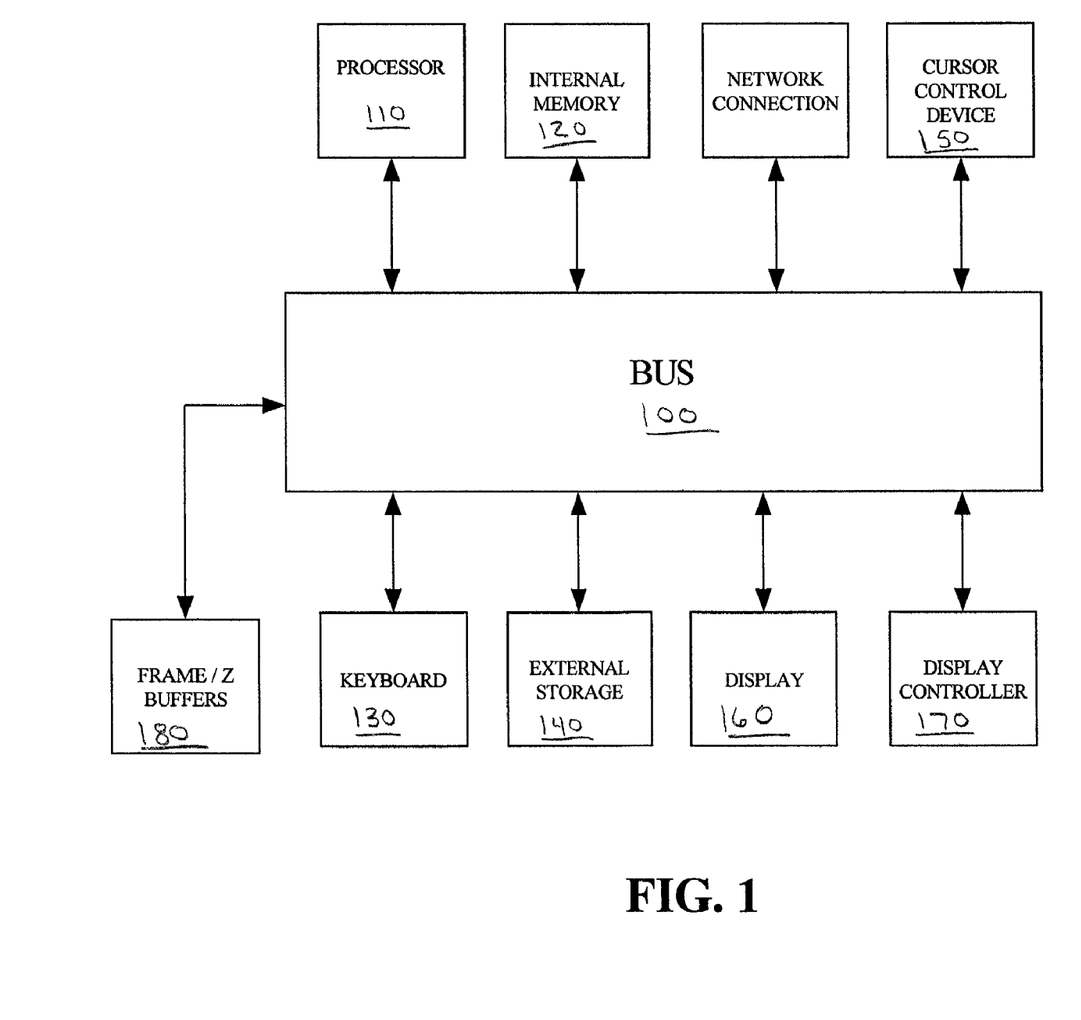
FIG. 1 is a functional block diagram of a computer-based display system suitable to practice the present invention.

With reference to FIG. 1, a computer-based display system on which preferred embodiments of the present invention may be implemented is illustrated. A computer system and associated operating instructions, e.g software, embodies circuitry used to implement the present invention. It is to be appreciated that the computer system preferably includes multi-tasking capabilities wherein multiple processing operations may be carried out concurrently. The computer system is comprised of a plurality of components coupled via a bus 100. The bus 100 consists of a plurality of parallel buses, such as address, data, and status buses, as well as a hierarchy of buses, e.g., a processor bus, a local bus, and an I/O bus. The computer system further includes a processor 110 for executing instructions provided via bus 100 from internal memory 120. The processor performs various operations, such as converting documents and applications into suitable format for display in the document workspace and interpreting and carrying out movement gestures by the user Instructions for performing such operations are retrieved from internal memory 120. The processor 110 and internal memory 120 may be discrete components or a single integrated device, such as an Application Specification Integrated Circuit (ASIC) chip.

Also coupled to the bus 100 are a keyboard 130 for entering alpha numeric input, external storage 140 for storing data, a cursor control device 150 for manipulating a multi-mode pointer or cursor, a display 160, such as a CRT or LC monitor, for displaying a three-dimensional visual output, i.e, the document workspace, and a network connection 170 and a display controller 190. The external storage 140 may be a fixed or removable magnetic or optical disk drive, such as a CD-ROM. The external storage 140 may itself store container and content objects, which are explained more fully below. The cursor control device 150 is used for controlling cursor or pointer movement on the display 160. This input device typically has two degrees of freedom in two axes, a first axis (x-axis) and a second axis (y-axis), which allows the device to specify any position in a plane. As is described more fully below, in the present invention, a three-dimensional cursor having a third degree of freedom in a z-axis is utilized. The cursor control device 150, such as a mouse or track ball, optionally includes a button or switch associated therewith to which the performance of certain functions can be programmed. In one embodiment, such a switch has a first up position and a second down position, which are used to select and move objects along all three axes within the three-dimensional workspace. Other cursor control devices include track pads, data gloves, head-trackers, pens, and other devices suitable for positioning a cursor on a computer monitor or display. The network connection 170 provides a means for attaching to a network, e.g, a Local Area Network card or modem card with appropriate software.

Also coupled to the bus 100 are frame and Z-buffers 180. The Z-buffer is a multi-layered buffer for storing data according to its relative display depth. The Z-buffer includes two registers. The first register includes the number of layers containing visible data for display. In the second register, a number of addresses corresponding to each of the layers of the Z-buffer are stored. Each address specifies a location where data for one of the layers is stored. The frame buffers are coupled to the Z-buffer and include pixel data corresponding to each layer of display.

Figure 2:
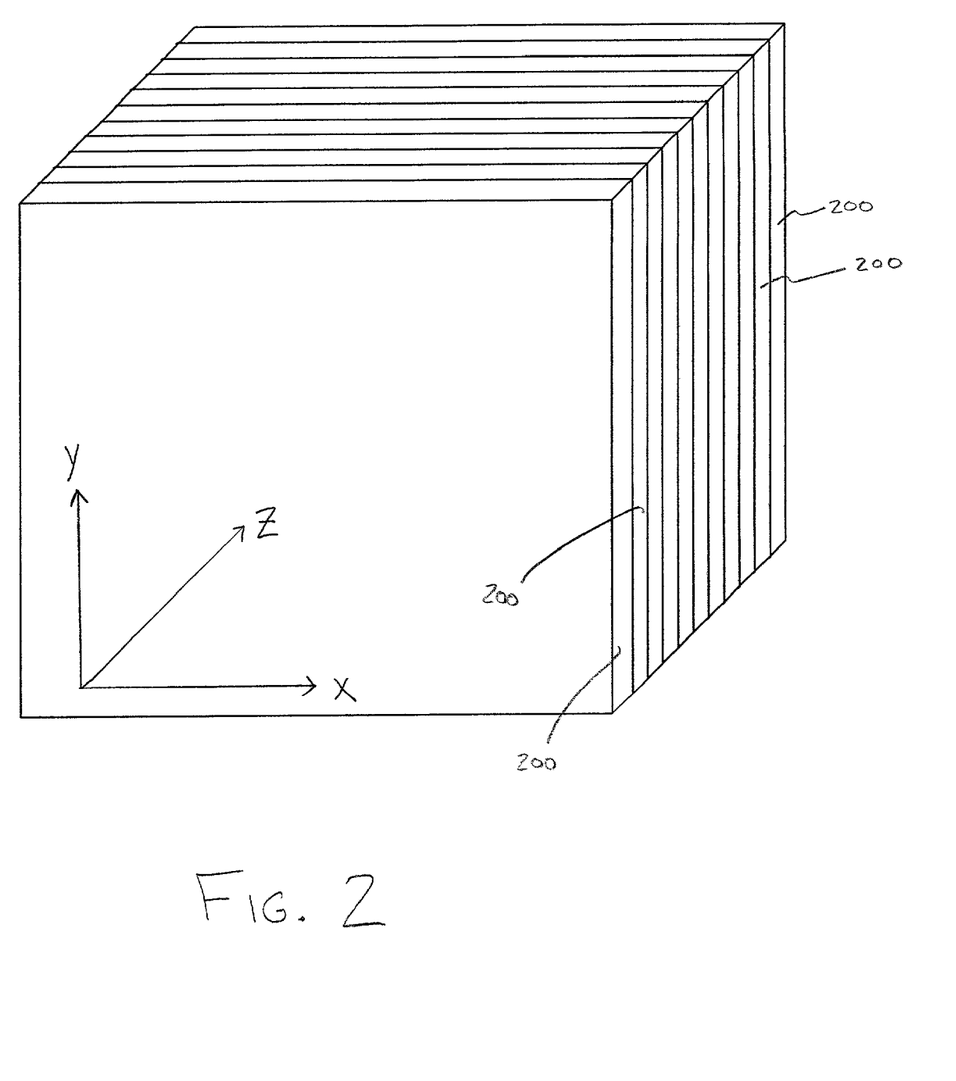
FIG. 2 is a diagrammatic illustration of a three-dimensional workspace partitioned into a plurality of layers in accordance with the present invention.

More particularly, as shown in FIG. 2, in order to achieve the visual perception of display depth, the three-dimensional workspace is partitioned to include a plurality of layers 200 along the z-axis. Each layer has a corresponding z-value within the Z-buffer corresponding to relative display depth, such that small z-values correspond to layers closer to a viewer or user, while large z-values correspond to layers further away from the user. As is explained more fully below, this structure, along with other visual cues, provide the perception of depth for a user navigating through the workspace. In one embodiment, the three-dimensional workspace is partitioned to include 256 layers along the z-axis. However, it is to be appreciated that depending on the desired z-axis resolution, the three-dimensional workspace may be partitioned into a greater or fewer number of layers.

Figure 3:
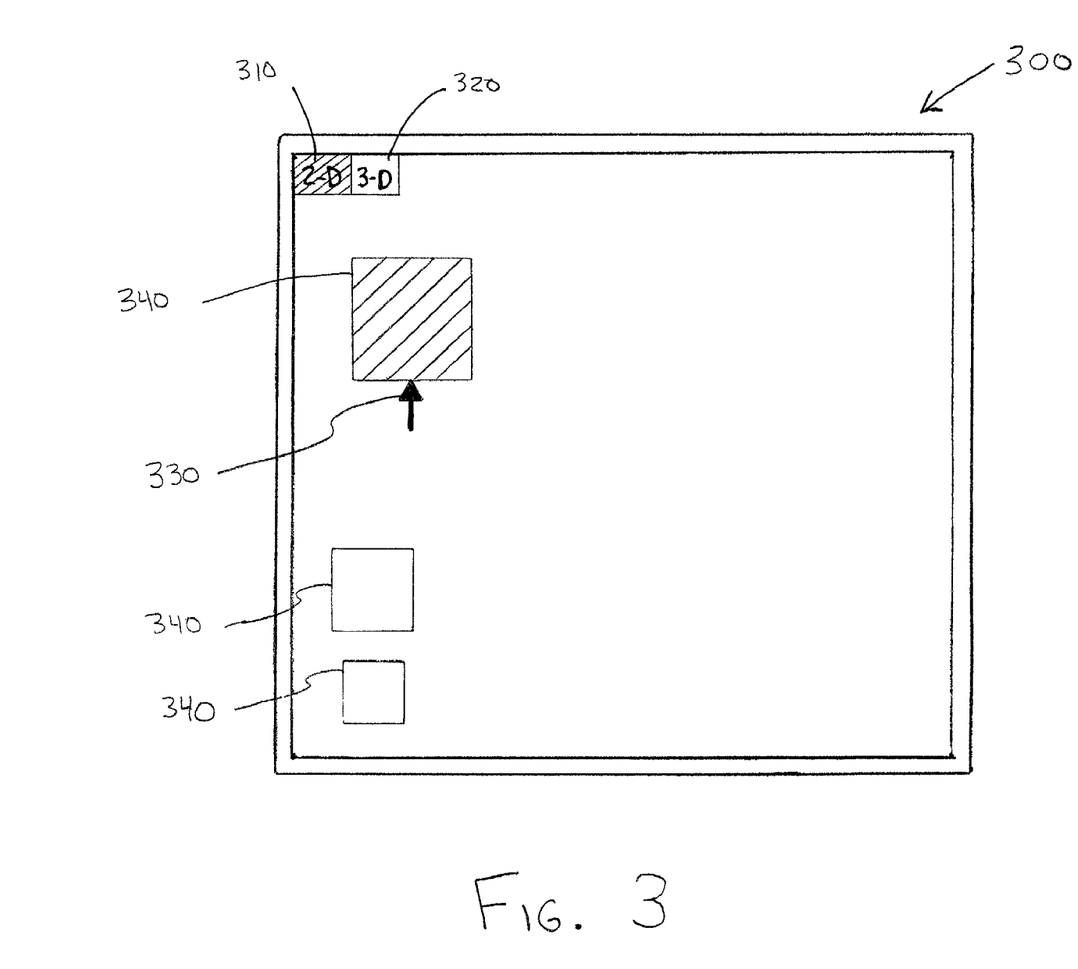
FIG. 3 is a diagrammatic illustration of a workspace display in a two-dimensional mode in accordance with the present invention.
Figure 4:
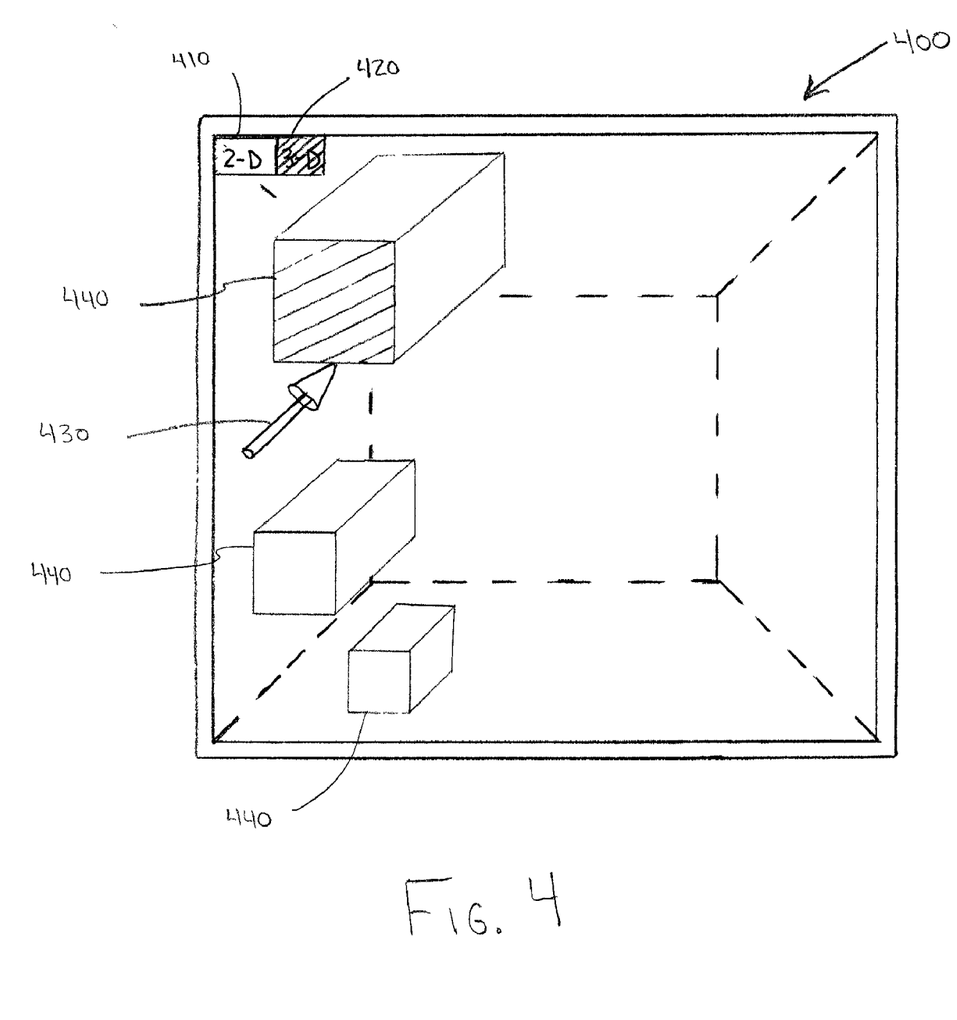
FIG. 4 is a diagrammatic illustration of a workspace display in a three-dimensional mode in accordance with the present invention.
Figure 5:
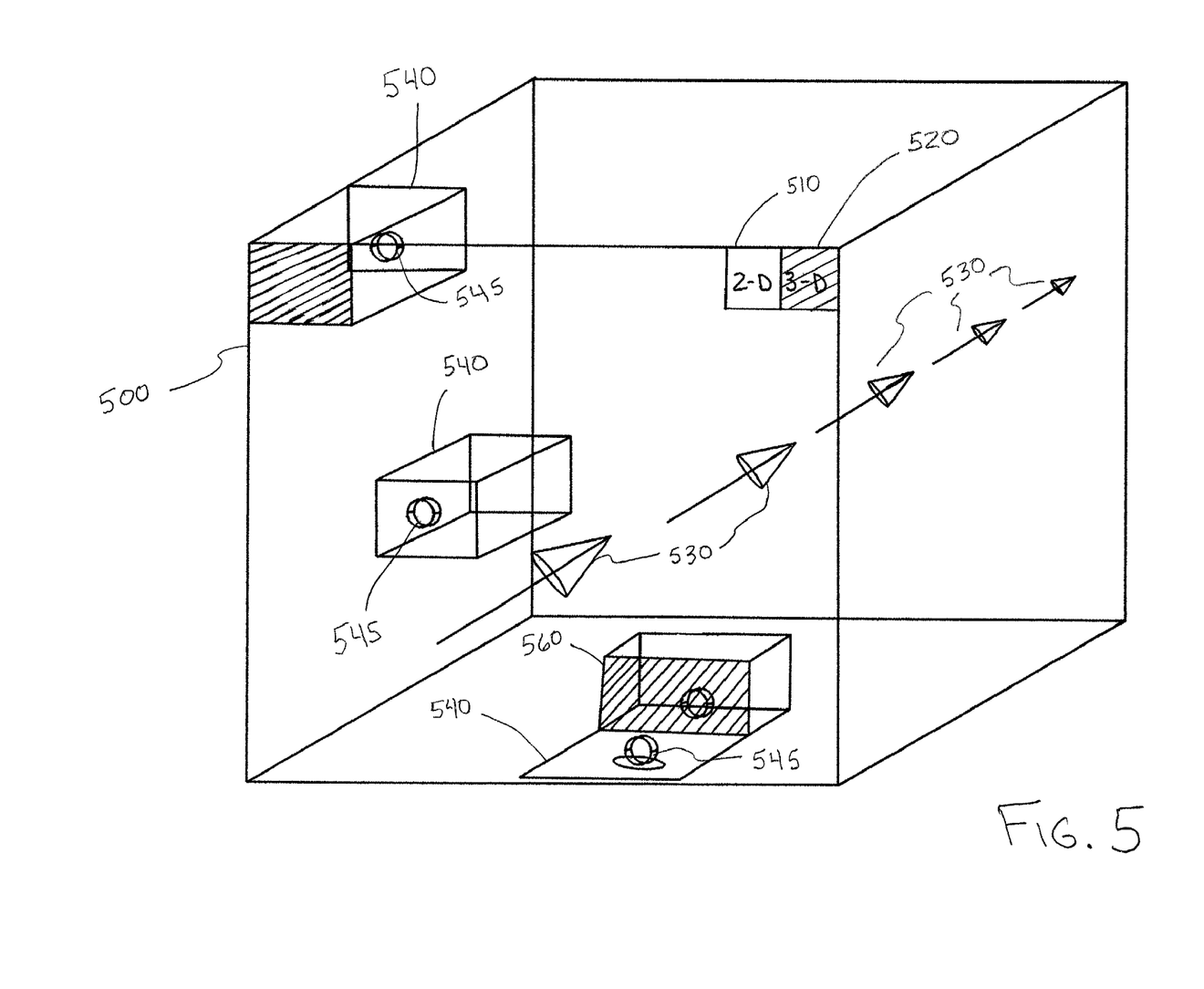
FIG. 5 is a perspective view of the three-dimensional workspace in accordance with the present invention.

With reference now to FIGS. 3–5, the user has the option of working in a conventional two-dimensional display mode or a three-dimensional display mode. For convenience, elements of the three (3) embodiments illustrated in FIGS. 4, 5, and 6, which correspond to the respective elements of the embodiment illustrated in FIG. 3, are given numerical references greater by one-hundred than the corresponding elements in FIG. 3. New components are designated by new numerals. With particular reference to FIG. 3, when navigating through the display workspace 300, the user may indicate a preference for working in a two-dimensional display mode by selecting the two-dimensional mode selector 310, as shown. Conversely, the user may indicate a preference for working in a three-dimensional workspace be selecting the three-dimensional mode selector 320. In the embodiment illustrated in FIG. 3, the user has chosen to work in a two-dimensional workspace. In this embodiment, the pointer or cursor 330 is displayed as a two-dimensional cursor operative to select one of a plurality of objects 340 present on the display. In the two-dimensional mode, the user perceives the cursor 330 and objects 340 to be located at a shallow depth, that is, a depth close to the surface of the display or video monitor.

As illustrated in FIG. 4, the user may view and navigate through a three-dimensional workspace or display 400 selecting the three-dimensional mode selector 420, as opposed to the two-dimensional mode selector 410. In the three-dimensional mode, a three-dimensional pointer or cursor 430 is displayed. Upon selection of the 3-D pointer, a plurality of depth cues are perceived by the user. For example, objects 440 to be accessed and manipulated by the user are displayed with three-dimensional depth attributes, as shown. Other depth cues, such as perspective tiling along one of the top, bottom, or sides of the workspace 400 may be provided to indicate depth. As is described more fully below, the opacity levels of the displayed objects 440 are varied to further provide depth perception within the display. By providing three-dimensional depth attributes to the objects created and managed by the operating system, the useful computer workspace is effectively enlarged for a standard graphical user interface.

With reference to FIG. 5 and continuing reference to FIG. 4, in the three-dimensional mode, the three-dimensional cursor 530 is dynamically sized in order to provide perception of depth within the display 500. More particularly, the display controller of the computer system dynamically sizes the cursor by automatically changing the size of the three-dimensional cursor as the cursor moves along the z-axis from layer to layer "toward" or "away" from the user. As is described more fully below, information is organized and displayed within the three-dimensional workspace 500 using a plurality of container objects 540, which optionally are represented by three-dimensional container object icons 545. Selectively accessing one or more of the container objects 540 reveals content objects 560 contained therein. The perception of display depth is further enhanced by depth cues such as altering the opacity level of container objects 540 and/or scaling the dimensions of the container objects.

Figure 6:
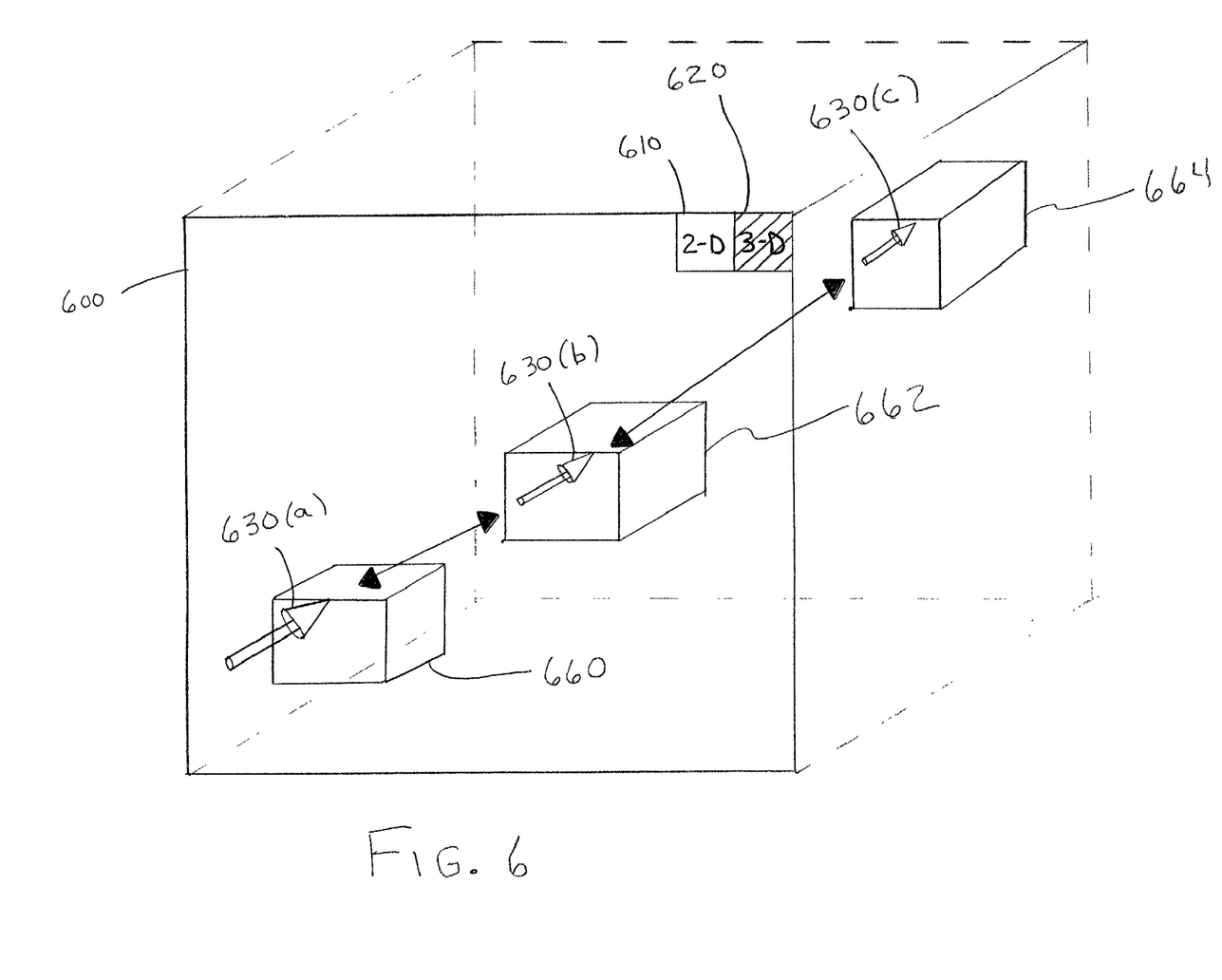
FIG. 6 is a perspective view of the three-dimensional workspace display, which illustrates dynamic cursor sizing, in accordance with the present invention.

With reference to FIG. 6, the dynamic sizing of the three-dimensional cursor 630 occurs as follows. In position 630(a) the cursor operates to select object 660, which is positioned at a relatively shallow display depth, that is, the display data associated with object 660 is in one or more frames or layers having relatively small z-values. As the cursor 630 is moved from position 630(a) to position 630(b), the computer system reduces the size of the cursor at position 630(b) relative to 630(a), thus indicating that object 662 is located at a deeper display depth relative to object 660. When the cursor is moved from position 630(b) to position 630(c) to select object 664, the cursor becomes even smaller, as shown, indicating that object 664 is located at a deeper display depth relative to object 662. Conversely, if the cursor were moved from position 630(c) to position 630(a), the size of the cursor would increase, indicating to the user that the cursor is back to a relatively shallow display depth, that is, a z-layer, which appears to be closer to the user on the display 600. When the cursor is located at the same z-position or value along a perspective plane, the cursor size appears to be the same on the display screen 600.

Figure 7:
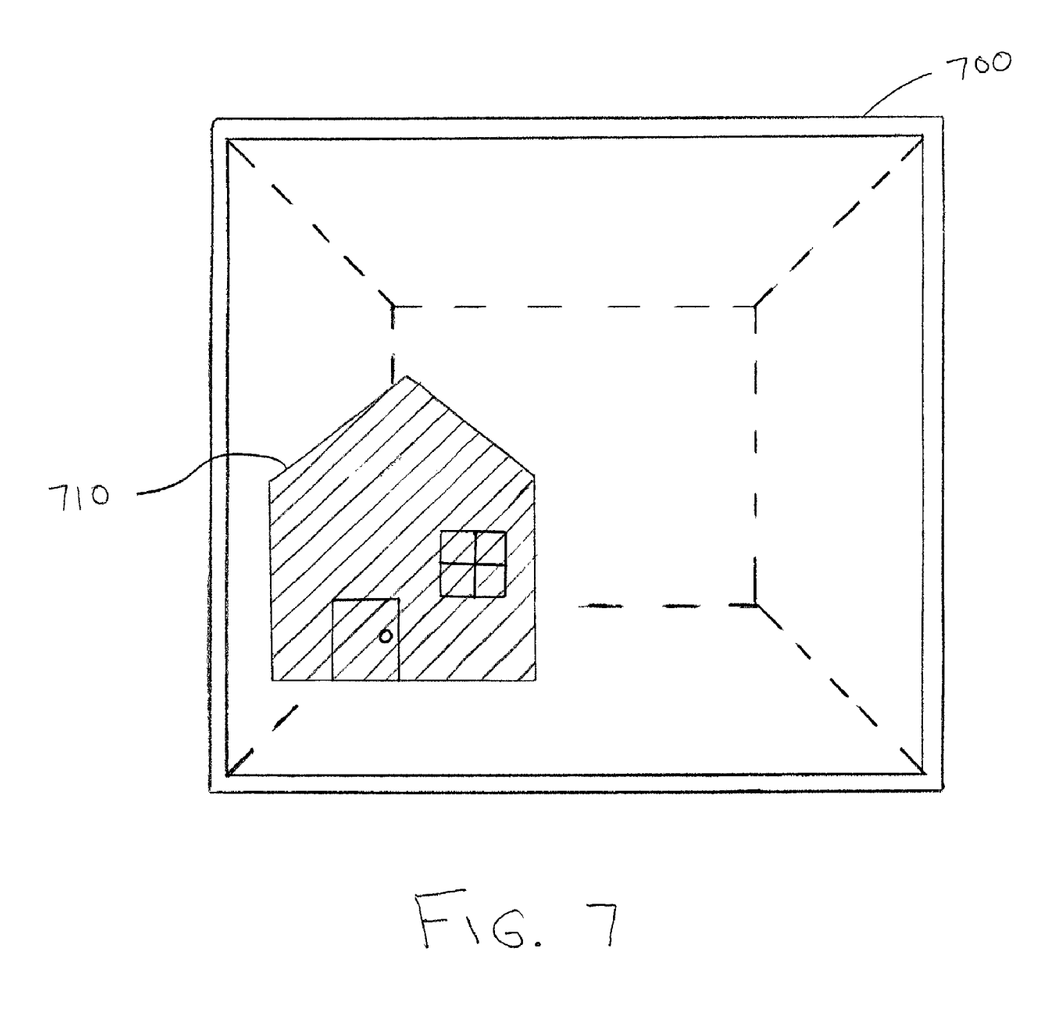
FIG. 7 is a diagrammatic illustration of a substantially opaque container object within a three-dimensional workspace display in accordance with the present invention.
Figure 8:
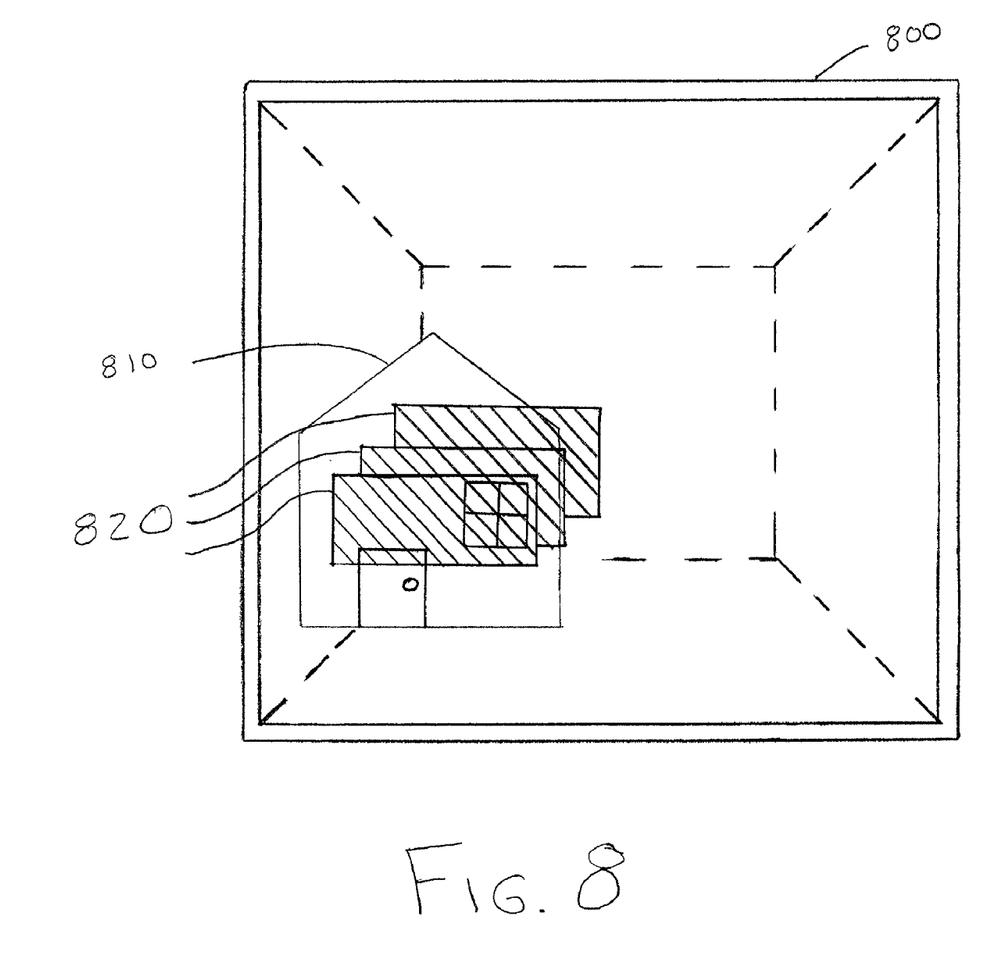
FIG. 8 is a diagrammatic illustration of the three-dimensional workspace illustrated in FIG. 7 with the opacity level of the container object reduced to reveal content objects in accordance with the present invention.

With reference to FIG. 7, container objects 710 may be displayed within the workspace 700 having a variety of shape, size, and depth attributes Further, container objects 710 are displayed at variable opacity levels. The opacity of an image is the number of opaque pixels compared to the total number of pixels in the image. An opaque pixel is a pixel that displays a portion of the image. Conversely, a transparent pixel does not display a portion of the image, but may be used to display an underlying image. As shown in FIG. 7, the display 700 includes a container object 710 in the shape of a house. Container object 710 is displayed at 100% opacity, i e, every pixel within the boundary of the house is used to display the image of the house With reference to FIG. 8 and continued reference to FIG. 7, a scenario is illustrated in which the house container object 810 has been selected by the user. In other words, the user positions the cursor (not shown) in contact with the representation of the house 810 and using the selected input device, indicates a desire to access the contents of the container object 810. In order to enhance the user's perception of display depth and provide better workspace organization, the opacity level of the house container object 810 is reduced in response to the user selecting it, revealing content objects 820 within container object 810. As shown in FIG. 8, container object 810 is displayed at an opacity level substantially less than 100%, e.g, 50% opacity, which means that one-half of the pixels within the image of the house are used to display image pixels lying underneath. In this case, the content objects 820 are a plurality of substantially opaque files perceived to be located at a deeper display depth, that is, at z-layers having higher z-values. It is to be appreciated that the file content objects 820 may represent documents and/or applications. As is understood by those skilled in the art, the opacity level of the container object 810 is reduced from 100% to something substantially less than 100% by selectively replacing pixels used to display the image of the house with pixels used to display the files located therein according to a selected dissolve or dither pattern by the computer processor and display controller.

It is to be appreciated that a plurality of pictorial container objects may be displayed with varying opacity and depth attributes. For example, FIG. 7 and FIG. 8 display a house container object in which files pertaining to a user's home may be contained. Other container objects include, but are not limited to, a telephone in which telephone numbers and addresses are kept, a file cabinet, in which file folders are kept, and a desk with drawers in which various file folders are kept.

In one embodiment of the present invention, each container object is secured with a different user password or passcode. For example, a family owning a single computer, which desires to lock away specific content objects, contained within container objects, may do so without having to log off the computer and log on again under a new family member's profile. In another exemplary embodiment, specialized technical representatives may be allowed to access to certain container object cabinets containing content object files within a workspace, while non-specialized technical representatives will not have access to the specific cabinets that are password protected.

It is to be appreciated that the present invention finds special application in conjunction with the creation and display of artistic representations. For example, in creating an artistic representation, an artist may create his or her work in a plurality of layers, each characterized by a specific z-value within the Z-buffer. More particularly, artistic representations may be displayed on the computer such that in the three-dimensional mode, a viewer or user may navigate "within" the image using the three-dimensional cursor. In other words, a particular image, which is stored as a plurality of layers, may be displayed in a layer-by-layer fashion, revealing additional detail not available within conventional two-dimensional displays. For example, the user may access the first layer of artistic representation using the three-dimensional cursor. The opacity level of the first layer is then reduced, revealing additional detail present in layers behind the first layer.

Figure 9:
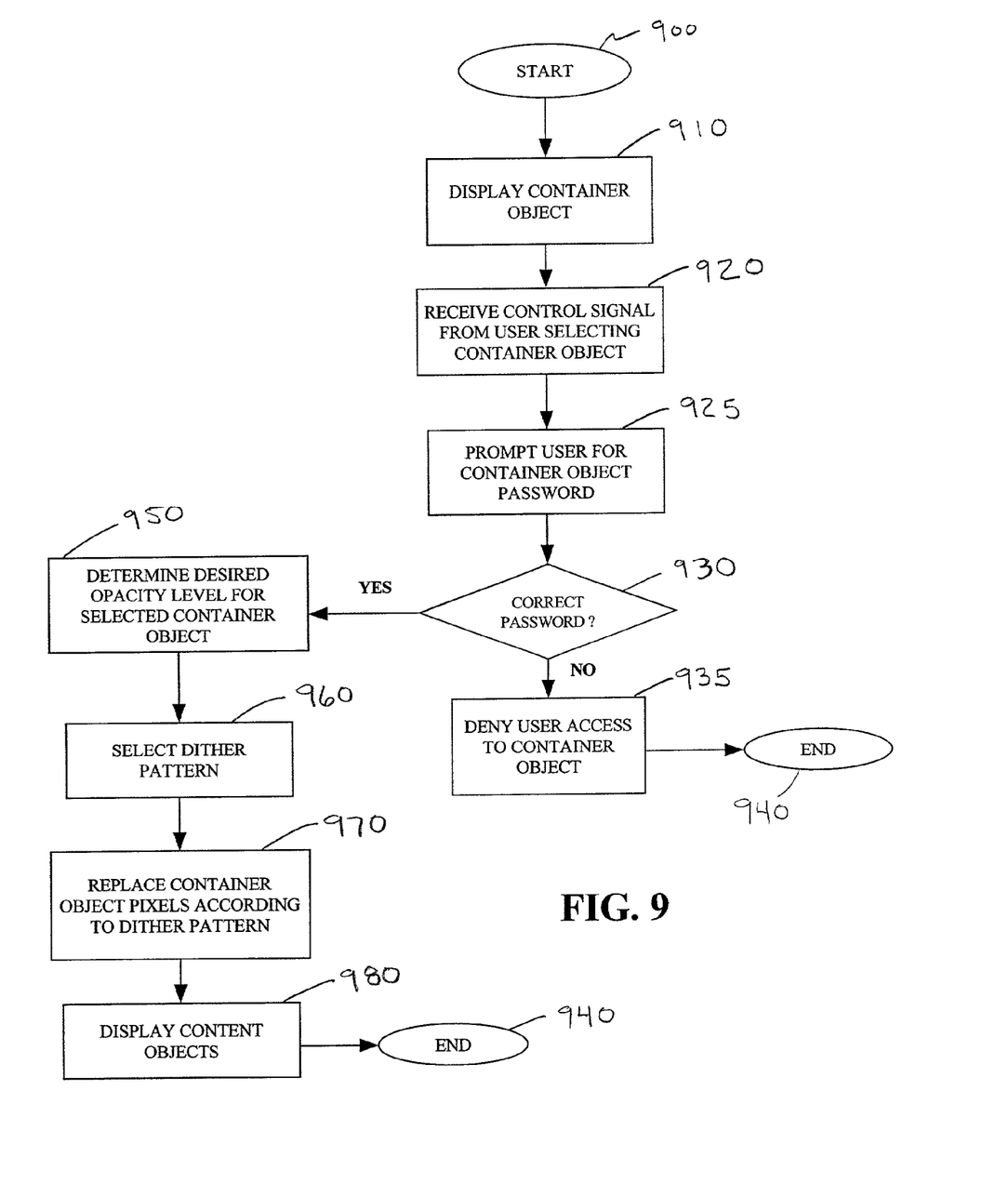
FIG. 9 is a flow chart illustrating a method of displaying information within a three-dimensional workspace on a computer display in accordance with the present invention.

With reference to FIG. 9, a method of displaying information within a three-dimensional workspace is illustrated. The method begins with START step 900. At least one container object is displayed 910. In response to a user selecting a container object, a control signal is received 920. Optionally, the user is prompted 925 for the corresponding container object password. The accuracy of the password is checked 930, and if it is deemed to be incorrect, the user is denied access 935 to the contents of the selected container. If an accurate password is provided by the user, the opacity level of a selected container object is reduced by determining 950 the desired opacity level for the selected container object. A dither pattern corresponding to the desired opacity level is selected 960. Container object pixels are replaced 970 according to the dither pattern, thus displaying content objects 980 contained therein.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. A method of displaying information within a three-dimensional workspace on a computer display, said method comprising:

partitioning the workspace into a plurality of layers, where each layer corresponds to a display depth relative to a user;

displaying at least one substantially opaque container object at a first display depth, wherein the at least one container object is three dimensional and defines an interior three dimensional space within the at least one container object;

providing to the user a pointer operative to select objects within the three-dimensional workspace at a plurality of display depths; and responsive to the user selecting a container object, reducing an opacity level of the selected container object in order to reveal at least one content object contained therein; and displaying the at least one content object contained within the selected container object at a deeper display depth relative to the first display depth.

2. The method as set forth in claim 1, wherein reducing the opacity of the selected container object includes:
   determining a desired opacity level of the selected container object;
   selecting a dither pattern corresponding to the desired opacity level; and
   replacing pixels corresponding to the container object with pixels corresponding to the at least one content object in accordance with the selected dither pattern.

3. The method as set forth in claim 1, further comprising:
   responsive to the user selecting a container object, prompting the user for a password corresponding to the selected container object.

4. The method as set forth in claim 3, wherein each container object is selectively accessible by providing a different password.

5. The method as set forth in claim 1, wherein the providing step includes:
   receiving a control signal indicating a user preference for one of (i) a two-dimensional pointer operative to select objects at the first display depth, and (ii) a three-dimensional pointer operative to select objects at the plurality of display depths.

6. The method as set forth in claim 5, further including:
   dynamically adjusting the size of the three-dimensional pointer based upon the layer being accessed by the user, such that the three-dimensional pointer is larger at the first display depth and smaller at the plurality of display depths.

7. In a computer system having a visual display system operating in conjunction with a visual display screen, a computer-implemented method of presenting a three-dimensional workspace having depth perception on the display screen, said method comprising:

displaying a plurality of substantially opaque container objects at a first display depth perceived to be proximate to the display screen, wherein the container objects are three dimensional and each define an interior three dimensional space within the container object;

providing to the user a three-dimensional cursor operative to navigate within the three-dimensional workspace; and, responsive to the user selecting one of the substantially opaque container objects;

reducing an opacity level of the selected substantially opaque container object; and displaying at least one content object at a deeper display depth relative to the first display depth.

8. The method as set forth in claim 7, wherein reducing the opacity level of the selected substantially opaque container object includes:
   replacing pixels from the substantially opaque container object with pixels from the at least one content object contained therein in accordance with a predetermined dither pattern.

9. The method as set forth in claim 7, further including:
   adjusting the size of the three-dimensional cursor based upon the display depth at which the user is navigating.

10. The method of claim 1, wherein the step of displaying at least one container object includes displaying a plurality of container objects.

11. The method of claim 10, wherein the plurality of container objects, include a plurality of content objects contained therein.

12. The method of claim 11, wherein at least one of the container objects has at least one of a shape, size or depth attribute different from other ones of the container objects.

13. The method of claim 7, wherein the plurality of container objects, include a plurality of content objects contained therein.

14. The method of claim 7, wherein at least one of the container objects has at least one of a shape, size or depth attribute different from other ones of the container objects.

15. The method as set forth in claim 1, wherein the at least one content object is three dimensional and is contained within the three dimensional space of the at least one container object.

16. The method as set forth in claim 7, wherein the at least one content object is three dimensional and is contained within the three dimensional space of the container objects.

17. The method as set forth in claim 5, wherein the control signal is software generated.

* * * * *